(12) United States Patent
Kong et al.

(10) Patent No.: US 8,193,272 B2
(45) Date of Patent: *Jun. 5, 2012

(54) FLAME-RETARDANT HIGH IMPACT VINYL AROMATIC RESIN COMPOSITION HAVING GOOD FLUIDITY

(75) Inventors: Seong Ho Kong, Uiwang-si (KR); Sung Hee Ahn, Uiwang-si (KR); Sung Duk Hwang, Uiwang-si (KR); In Hwan Oh, Uiwang-si (KR); Se Bum Son, Uiwang-si (KR); Hye Jin Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,258

(22) Filed: Dec. 1, 2009

(65) Prior Publication Data

US 2010/0152342 A1    Jun. 17, 2010

(30) Foreign Application Priority Data

Dec. 15, 2008    (KR) .................. 10-2008-0127479

(51) Int. Cl.
*C08K 5/02*    (2006.01)
*C08K 5/03*    (2006.01)

(52) U.S. Cl. ........ 524/464; 524/466; 524/469; 524/577; 252/601; 252/609; 570/183

(58) Field of Classification Search ............... 524/464, 524/577, 406, 466, 469; 570/183; 252/601, 252/609

See application file for complete search history.

(56) References Cited

U.S. PATENT DOCUMENTS

| 4,027,073 | A |   | 5/1977 | Clark |
| 4,585,818 | A |   | 4/1986 | Jung et al. |
| 4,994,515 | A |   | 2/1991 | Washiyama et al. |
| 5,039,729 | A | * | 8/1991 | Brackenridge et al. ....... 524/412 |
| 5,055,235 | A |   | 10/1991 | Brackenridge et al. |
| 5,290,855 | A |   | 3/1994 | Kodama et al. |
| 5,635,565 | A |   | 6/1997 | Miyajima et al. |
| 5,712,336 | A |   | 1/1998 | Gareiss et al. |
| 5,989,723 | A |   | 11/1999 | Tsai et al. |
| 6,117,371 | A |   | 9/2000 | Mack |
| 6,447,913 | B1 |   | 9/2002 | Watanabe et al. |
| 7,288,587 | B2 |   | 10/2007 | Saitou et al. |
| 2001/0041772 | A1 |   | 11/2001 | Masubuchi et al. |
| 2005/0137311 | A1 | * | 6/2005 | Muylem et al. ............... 524/464 |
| 2007/0049674 | A1 |   | 3/2007 | Kim et al. |
| 2008/0088961 | A1 |   | 4/2008 | Kushida |
| 2008/0160240 | A1 | * | 7/2008 | Son et al. .................... 428/36.92 |
| 2008/0221255 | A1 |   | 9/2008 | Ahn et al. |
| 2010/0029828 | A1 | * | 2/2010 | Ahn et al. .................... 524/464 |
| 2010/0041800 | A1 |   | 2/2010 | Son et al. |
| 2010/0113648 | A1 |   | 5/2010 | Niessner et al. |
| 2010/0152372 | A1 | * | 6/2010 | Oh et al. ...................... 524/577 |
| 2010/0168292 | A1 |   | 7/2010 | Son et al. |
| 2010/0168315 | A1 |   | 7/2010 | Park et al. |
| 2010/0249314 | A1 |   | 9/2010 | Park et al. |
| 2011/0160343 | A1 |   | 6/2011 | Son et al. |

FOREIGN PATENT DOCUMENTS

| EP | 0347116 A2 | 12/1989 |
| EP | 0489912 A1 | 6/1992 |
| EP | 0502333 A1 | 9/1992 |
| JP | 01-163243 A | 6/1989 |
| JP | 01-263149 | 10/1989 |
| JP | 01-304153 A | 12/1989 |
| JP | 05-295196 A | 11/1993 |
| JP | 05-339479 A | 12/1993 |
| JP | 06-322200 A | 11/1994 |
| JP | 08-311300 A | 11/1996 |
| JP | 10-175893 | 6/1998 |
| JP | 2001-139742 A | 5/2001 |
| JP | 14-97374 A | 4/2002 |
| JP | 2005-272640 A | 10/2005 |
| JP | 18-111787 A | 4/2006 |
| JP | 2006-143955 | 6/2006 |
| JP | 2007-314619 | 12/2007 |
| KR | 10-1991-0000910 A | 1/1991 |
| KR | 910008803 B1 | 10/1991 |
| KR | 10-1994-0026146 A | 12/1994 |
| KR | 159256 B1 | 1/1999 |
| KR | 10-2004-0022374 A | 3/2004 |
| KR | 2004-0079118 A | 9/2004 |
| WO | 90/15103 A1 | 12/1990 |

(Continued)

OTHER PUBLICATIONS

Office Action in commonly owned U.S. Appl. No. 12/797,645 mailed Apr. 22, 2011, pp. 1-7.
U.S. Patent Office Advisory Action in commonly owned U.S. Appl. No. 12/037,123 dated Oct. 18, 2010, pp. 1-3.
International Preliminary Report on Patentability in commonly owned International Application No. PCT/KR2007/006833 dated Jun. 30, 2009, pp. 1-4.
Office Action in commonly owned U.S. Appl. No. 12/538,266, mailed on Oct. 27, 2010, pp. 1-7.
Office Action in commonly owned U.S. Appl. No. 12/037,123 mailed on Jan. 25, 2010, pp. 1-11.
Office Action in commonly owned U.S. Appl. No. 12/037,123 mailed on Jun. 29, 2010, pp. 1-10.
International Search Report in commonly owned International Application No. PCT/KR2007/006833, dated Mar. 25, 2008, pp. 1-2.

(Continued)

*Primary Examiner* — James J Seidleck
*Assistant Examiner* — Deve E Valdez
(74) *Attorney, Agent, or Firm* — Summa, Additon & Ashe, P.A.

(57) ABSTRACT

The flame-retardant high impact vinyl aromatic resin composition of the present invention comprises (A) about 100 parts by weight of a rubber modified vinyl aromatic resin; (B) about 1 to about 30 parts by weight of a brominated diphenyl ethane mixture; and (C) about 1 to about 10 parts by weight of antimony oxide. The resin composition can have excellent fluidity as well as high impact strength and can provide a flame-retardant high impact vinyl aromatic resin composition having excellent workability and mechanical properties.

12 Claims, No Drawings

FOREIGN PATENT DOCUMENTS

| | | |
|---|---|---|
| WO | 92/00351 A1 | 1/1992 |
| WO | 2008/082138 A1 | 7/2008 |
| WO | 2009/084808 A1 | 7/2009 |

OTHER PUBLICATIONS

Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3.

Machine Translation of JP 2005-272640A, downloaded from http://www19.ipdl.inpit.go.jp/PA1/cgi-bin/PA1DETAIL, Jun. 23, 2009, pp. 1-13.

Office Action in commonly owned U.S. Appl. No. 12/647,620, mailed on Jan. 31, 2011, pp. 1-10.

Korean Office Action in commonly owned Korean Application No. 2008-128424 dated Oct. 29, 2010, pp. 1-3.

U.S. Patent Office Advisory Action in commonly owned U.S. Appl. No. 11/965,013 dated May 7, 2010, pp. 1-9.

Office Action in commonly owned U.S. Appl. No. 11/965,013, mailed on Jan. 28, 2010, pp. 1-17.

Office Action in commonly owned U.S. Appl. No. 11/965,013, mailed on Jul. 1, 2009, pp. 1-18.

Notice of Allowance in commonly owned U.S. Appl. No. 12/037,123 mailed on Feb. 1, 2011, pp. 1-8.

Chinese Office Action in commonly owned Chinese Application No. 200910166160 dated Nov. 29, 2010, pp. 1-5.

English translation of Chinese Office Action in commonly owned Chinese Application No. 200910166160 dated Nov. 29, 2010, pp. 1-6.

Korean Office Action in commonly owned Korean Application No. 2008-128424 dated May 27, 2011, pp. 1-4.

Notice of Allowance in commonly owned U.S. Appl. No. 12/538,266 mailed on Feb. 17, 2011, pp. 1-8.

Office Action in commonly owned U.S. Appl. No. 12/512,134, mailed on Apr. 21, 2010, pp. 1-6.

Office Action in commonly owned U.S. Appl. No. 12/512,134, mailed on Aug. 27, 2010, pp. 1-5.

International Search Report in commonly owned International Application No. PCT/KR2008/006528, dated Jun. 1, 2009, pp. 1-4.

BASF, Joncryl ADR-4370-S, Mar. 13, 2007, pp. 1-9.

Villalobos et al., "Oligomeric chain extenders for economic reprocessing and recycling of condensation plastics," ScineceDirect, Energy 31, 2006, pp. 3227-3234.

Office Action in commonly owned U.S. Appl. No. 12/647,601, mailed on Apr. 21, 2011, pp. 1-11.

Notice of Allowance in commonly owned U.S. Appl. No. 12/512,134 mailed on Mar. 8, 2011, pp. 1-5.

Office Action in commonly owned U.S. Appl. No. 12/613,584, mailed Jan. 12, 2012, pp. 1-8.

Office Action in commonly owned U.S. Appl. No. 12/884,576, mailed Dec. 22, 2011, pp. 1-8.

* cited by examiner

FLAME-RETARDANT HIGH IMPACT VINYL AROMATIC RESIN COMPOSITION HAVING GOOD FLUIDITY

CROSS REFERENCE TO RELATED APPLICATIONS

This application claims priority from Korean Patent Application No. 2008-127479 filed on Dec. 15, 2008 in the Korean Intellectual Property Office, the disclosure of which is incorporated herein by reference in its entirety.

FIELD OF THE INVENTION

The present invention relates to a flame-retardant high impact vinyl aromatic resin composition.

BACKGROUND OF THE INVENTION

In general, high impact polystyrene (HIPS) resins can have excellent mechanical strength and extrusion and injection workability and thus are used for interior and exterior materials of electric and electronic appliances. However, HIPS resins have poor flame resistance and can expand and sustain combustion since the resins themselves are decomposed when ignited. Due to increased social concerns and standardized fire safety requirements, there is an increasing need to manufacture flame-retardant exterior materials for electric and electronic appliances.

One method for imparting flame retardancy to HIPS resins includes adding flame retardants containing inert elements, such as halogen, phosphorous and the like, and flame retarding aids to the HIPS resins. As an example, halogen-containing organic compounds and antimony-containing inorganic compounds can be mixed with high impact polystyrene resins to impart flame retardancy to the resin. Halogen-containing organic compounds typically used include decabromodiphenyl ether, decabromodiphenyl oxide, decabromodiphenyl ethane, tetrabromobisphenol A, brominated epoxy oligomers, hexabromocyclododecane, 2,4,6-tris(2,4,6-tribromophenoxy)-1,3,5-triazine, and the like.

However, in order to obtain UL94 V-0 ratings, excessive amounts of halogen compounds and antimony trioxide should be added to the HIPS resins. This can, however, deteriorate mechanical properties and fluidity of the HIPS resins. For example, brominated epoxy oligomers are substantially incompatible with high impact polystyrene resins and can thereby lower mechanical properties such as impact strength, even though higher molecular weight brominated epoxy oligomers can increase heat resistance. Decabromodiphenyl ethane can lower impact strength and fluidity of a resin composition and make a final resin product opaque due to its high melting point and lack of dispersibility in the resins. Further, 2,4,6-tris(2,4,6-tribromophenoxy)-1,3,5-triazine is not desirable from an environmental aspect since it is prepared using tri-bromophenol.

SUMMARY OF THE INVENTION

The present inventors provide a flame-retardant high impact vinyl aromatic resin composition, which can have improved impact resistance and fluidity, by adding a brominated diphenyl ethane mixture to improve compatibility with rubber modified vinyl aromatic resins. The brominated diphenyl ethane mixture can provide good flame retardancy, even when used in a small amount. The brominated diphenyl ethane mixture further can reduce the specific gravity of a final product and also can maintain or reveal the inherent color of the product since flame retardancy can be accomplished even with a small amount of flame retardant.

The present invention further provides a high impact vinyl aromatic resin composition that can have excellent flame retardancy.

The present invention further provides a high impact vinyl aromatic resin composition that can have a balance of physical properties such as impact resistance and fluidity by using a flame retardant with improved compatibility with the high impact vinyl aromatic resin.

The present invention provides a flame-retardant high impact vinyl aromatic resin composition. The resin composition comprises about 100 parts by weight of a rubber modified vinyl aromatic resin (A); about 1 to about 30 parts by weight of a brominated diphenyl ethane mixture (B); and about 1 to about 10 parts by weight of antimony oxide (C).

In an exemplary embodiment, the resin composition may comprise about 100 parts by weight of a rubber modified vinyl aromatic resin (A); about 3 to about 27 parts by weight of a brominated diphenyl ethane mixture (B); and about 1 to about 7 parts by weight of antimony oxide (C).

In another exemplary embodiment, the resin composition may comprise about 100 parts by weight of a rubber modified vinyl aromatic resin (A); about 10 to about 27 parts by weight of a brominated diphenyl ethane mixture (B); and about 1 to about 5 parts by weight of antimony oxide (C).

In a further exemplary embodiment, the resin composition may comprise 100 parts by weight of a rubber modified vinyl aromatic resin (A); about 10 to about 20 parts by weight of a brominated diphenyl ethane mixture (B); and about 1 to about 5 parts by weight of antimony oxide (C).

In a still further exemplary embodiment, the resin composition may comprise about 100 parts by weight of a rubber modified vinyl aromatic resin (A); about 21 to about 26 parts by weight of a brominated diphenyl ethane mixture (B); and about 1 to about 5 parts by weight of antimony oxide (C).

The rubber modified vinyl aromatic resin (A) may be a polymer comprising about 5 to about 15% by weight of a rubber polymer and about 85 to about 95% by weight of a vinyl aromatic monomer.

In an exemplary embodiment, the rubber modified vinyl aromatic resin (A) may be a mixture of a rubber modified vinyl aromatic resin (A1) having an average rubber particle diameter of about 0.1 to about 0.9 μm and a rubber modified vinyl aromatic resin (A2) having an average rubber particle diameter of about 0.9 to about 4 μm.

In an exemplary embodiment, the brominated diphenyl ethane mixture (B), which is prepared by brominating diphenyl ethane, may comprise about 5 to about 85% by weight of hexabromodiphenyl ethane and about 0 to about 30% by weight of heptabromodiphenyl ethane, based on the total weight of the brominated diphenyl ethane mixture.

In another exemplary embodiment, the brominated diphenyl ethane mixture (B) may comprise about 55 to about 85% by weight of hexabromodiphenyl ethane and about 1 to about 25% by weight of odd numbered brominated diphenylethanes, based on the total weight of the brominated diphenyl ethane mixture.

In a further exemplary embodiment, the brominated diphenyl ethane mixture (B) may comprise about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodiphenyl ethane.

In a still further exemplary embodiment, the brominated diphenyl ethane mixture (B) may comprise about 5 to about 15% by weight of pentabromodiphenyl ethane, about 72 to about 85% by weight of hexabromodiphenyl ethane, about 2 to about 10% by weight of heptabromodiphenyl ethane, and about 0.1 to about 3% by weight of octabromodiphenyl ethane.

In a still further exemplary embodiment, the brominated diphenyl ethane mixture (B) may comprise about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

In a still further exemplary embodiment, the brominated diphenyl ethane mixture (B) may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

In a still further exemplary embodiment, the brominated diphenyl ethane mixture (B) may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodiphenyl ethane.

The resin composition may further comprise a bromine-based flame retardant (D). If the resin composition comprises the bromine-based flame retardant (D), the resin composition can comprise about 10 to about 30 parts by weight of a mixture of the bromine-based flame retardant (D) and the brominated diphenyl ethane mixture (B) based on about 100 parts by weight of the rubber modified vinyl aromatic resin.

The resin composition may further comprise one or more additives, such as a plasticizer, a flame retardant other than a halogen-based flame retardant, an anti-dripping agent, a thermal stabilizer, a release agent, a weather resistant stabilizer, a halogen stabilizer, a lubricant, a filler, a coupling agent, a photostabilizer, an antioxidant, a coloring agent, an antistatic agent, a dispersant, an impact modifier, and the like, and combinations thereof.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Rubber Modified Vinyl Aromatic (A)

The rubber modified vinyl aromatic resin of the present invention can be produced by polymerizing a rubber polymer with a vinyl aromatic monomer. The rubber modified vinyl aromatic resin of the present invention may also be referred to as a rubber modified polystyrene resin, Examples of the rubber polymer may include without limitation diene-based rubbers, such as butadiene rubbers, styrene-butadiene copolymers and poly(acrylonitrile-butadiene), saturated rubbers in which hydrogen is added to the diene-based rubbers, isoprene rubbers, acryl-based rubbers, ethylene-propylene-diene terpolymers (EPDM), and the like, and combinations thereof. Among these examples, polybutadiene, styrene-butadiene copolymers, isoprene rubbers, and alkyl acrylate rubbers may be employed. The rubber polymer may be used in the amount of about 5 to about 15% by weight based on the total weight of the rubber modified vinyl aromatic resin. The rubber may have a particle size of about 0.1 to about 4.0 µm.

In an exemplary embodiment, the rubbers may be dispersed in the form of a bi-modal or a tri-modal rubber with respect to rubber particle diameter. In one exemplary embodiment, the rubber modified vinyl aromatic resin (A) may be a mixture of a rubber modified vinyl aromatic resin (A1) having an average rubber particle diameter of about 0.1 to about 0.9 µm and a rubber modified vinyl aromatic resin (A2) having an average rubber particle diameter of about 0.9 to about 4 µm. Although there is not a particular limit on a mixing ratio of the rubber modified vinyl aromatic resin (A1) and the rubber modified vinyl aromatic resin (A2), they may be used at a weight ratio of about 3:7 to about 7:3, for example about 5.5:4.5 to about 7:3.

Examples of the vinyl aromatic monomer may include without limitation styrene, α-methylstyrene, β-methylstyrene, p-methylstyrene, para-t-butylstyrene, ethylstyrene, and the like, and combinations thereof. The vinyl aromatic monomer may be added in the amount of about 85 to about 95% by weight based on the total weight of the rubber modified vinyl aromatic resin.

The rubber modified vinyl aromatic resin (A) of the present invention may further include additional monomers such as acrylonitrile, acrylic acid, methacrylic acid, maleic anhydride, N-substituted maleimide, and the like, and combinations thereof in order to impart properties such as chemical resistance, workability and heat resistance. These monomers may be added in an amount of about 40% by weight or less based on the total weight of the rubber modified vinyl aromatic resin.

The rubber modified vinyl aromatic resin may be polymerized by thermal polymerization without an initiator, or polymerized with an initiator. Examples of polymerization initiators may include without limitation peroxide-based initiators such as benzoyl peroxide, t-butyl hydroperoxide, acetyl peroxide and cumene hydroperoxide, azo-based initiators such as azobis isobutyronitrile, and the like, and combinations thereof. However, the polymerization initiator is not necessarily limited thereto.

The rubber modified vinyl aromatic resin (A) may be produced by bulk polymerization, suspension polymerization, emulsion polymerization, or a combination thereof. Among these, the bulk polymerization may be used.

Brominated Diphenyl Ethane Mixture (B)

The brominated diphenyl ethane mixture (B) of the present invention is a mixture produced by brominating diphenyl ethane and is a reaction product obtained by adding about 5 to about 9 bromine atoms to diphenyl ethane and then recovering brominated diphenyl ethane from the reactant. In an exemplary embodiment, the brominated diphenyl ethane mixture (B) comprises about 5 to about 85% by weight of hexabromodiphenyl ethane and about 0 to about 30% by weight of heptabromodiphenyl ethane, based on the total weight of the brominated diphenyl ethane mixture.

In one exemplary embodiment, the brominated diphenyl ethane mixture may be prepared by injecting bromine into a reactor including diphenyl ethane, a solvent, and a catalyst, and maintaining the reactor at a temperature of about −20 to about 35° C. to react the materials for about 0.5 to about 24 hours.

The catalyst may be a metal, such as aluminum or antimony, a bromide or a chloride of the metal, or a combination thereof. Examples of the catalyst may include without limitation Al, AlCl$_3$, Sb, SbCl$_3$, SbCl$_5$, SbBr$_3$, SbClBr$_4$, SbBrCl$_4$, Fe, FeCl$_3$, FeBr$_3$, Ti, TiCl$_4$, TiBr$_4$, Sn, SnCl$_2$, SnBr$_3$, SnCl$_4$, AlBr$_3$, Be, BeCl$_2$, Cd, CdCl$_2$, Zn, ZnCl$_2$, B, BF$_4$, BCl$_3$, BBr$_3$, BiCl$_3$, and the like, and combinations thereof. The catalyst can be used in the amount of about 0.01 to about 3 moles per about 1 mole of diphenyl ethane.

Bromine can be injected at a ratio of about 5 to about 9 moles, for example about 6.0 to about 8 moles, as another example about 6.2 to about 7.7 moles, per about 1 mole of diphenyl ethane such that about 5 to about 8.5 hydrogens in diphenyl ethane are substituted with Br.

In an exemplary embodiment, the brominated diphenyl ethane mixture may be a mixture of hexabromodiphenyl ethane, heptabromodiphenyl ethane, and octabromodiphenyl ethane, or a mixture of tetrabromodiphenyl ethane, pentabromodiphenyl ethane, and hexabromodiphenyl ethane.

In another exemplary embodiment, the brominated diphenyl ethane mixture may further comprise pentabromodiphenyl ethane, nonabromodiphenyl ethane, decabromodiphenyl ethane, and low molecular weight hydrocarbon. Examples of the low molecular weight hydrocarbon may include without limitation monobromodiphenyl ethane, dibromodiphenyl ethane, tribromodiphenyl ethane, tetrabromodiphenyl ethane, and the like, and combinations thereof.

Based on an area ratio in a GC/MS analysis, the brominated diphenyl ethane mixture may comprise heptabromodiphenyl ethane in an amount of about 0 to about 30% by weight, for example about 0.01 to about 20% by weight, and as another example about 0.01 to about 17% by weight. Further, the brominated diphenyl ethane mixture may comprise hexabromodiphenyl ethane in an amount of about 5 to about 85% by weight, for example about 10 to about 85% by weight, and as another example about 55 to about 85% by weight.

In an exemplary embodiment, the brominated diphenyl ethane mixture (B) may comprise about 55 to about 85% by weight of hexabromodiphenyl ethane and about 1 to about 25% by weight of odd numbered brominated diphenylethanes in the total brominated diphenyl ethane mixture. The odd numbered brominated diphenylethanes can include pentabromodiphenyl ethane, heptabromodiphenyl ethane, nonabromodiphenyl ethane, or combinations of two or more thereof.

In an exemplary embodiment, based on an area ratio in a GC/MS analysis, the brominated diphenyl ethane mixture may comprise about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodiphenyl ethane.

In another exemplary embodiment, the brominated diphenyl ethane mixture may comprise about 5 to about 15% by weight of pentabromodiphenyl ethane, about 72 to about 85% by weight of hexabromodiphenyl ethane, about 2 to about 10% by weight of heptabromodiphenyl ethane, and about 0.1 to about 3% by weight of octabromodiphenyl ethane. In a further exemplary embodiment, the brominated diphenyl ethane mixture may comprise about 10 to about 15% by weight of pentabromodiphenyl ethane, about 75 to about 82% by weight of hexabromodiphenyl ethane, about 5 to about 10% by weight of heptabromodiphenyl ethane, and about 0.1 to about 1% by weight of octabromodiphenyl ethane.

In a still further exemplary embodiment, the brominated diphenyl ethane mixture may comprise about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane. In a still further exemplary embodiment, the brominated diphenyl ethane mixture may comprise about 55 to about 70% by weight of hexabromodiphenyl ethane, about 12 to about 16% by weight of heptabromodiphenyl ethane, about 12 to about 20% by weight of octabromodiphenyl ethane, about 5 to about 9% by weight of nonabromodiphenyl ethane, and about 0.01 to about 1% by weight of decabromodiphenyl ethane.

In a further exemplary embodiment, the brominated diphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

In a still further exemplary embodiment, the brominated diphenyl ethane mixture may comprise about 1 to about 2.5% by weight of pentabromodiphenyl ethane, about 60 to about 75% by weight of hexabromodiphenyl ethane, about 10 to about 14% by weight of heptabromodiphenyl ethane, about 10 to about 17% by weight of octabromodiphenyl ethane, about 3 to about 6% by weight of nonabromodiphenyl ethane, and about 0.1 to about 1% by weight of decabromodiphenyl ethane.

In a still further exemplary embodiment, the brominated diphenyl ethane mixture may comprise about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodiphenyl ethane.

In a further exemplary embodiment, the brominated diphenyl ethane mixture may comprise about 55 to about 83% by weight of hexabromodiphenyl ethane, about 7 to about 17% by weight of heptabromodiphenyl ethane, about 5 to about 23% by weight of octabromodiphenyl ethane, about 1 to about 7% by weight of nonabromodiphenyl ethane, and about 0.01 to about 1% by weight of decabromodiphenyl ethane.

In a still further exemplary embodiment, the brominated diphenyl ethane mixture may comprise about 10 to about 25% by weight of tetrabromodiphenyl ethane, about 55 to about 75% by weight of pentabromodiphenyl ethane, and about 10 to about 35% by weight of hexabromodiphenyl ethane.

In a still further exemplary embodiment, the brominated diphenyl ethane mixture may comprise about 0.5 to about 3% by weight of pentabromodiphenyl ethane, about 75 to about 85% by weight of hexabromodiphenyl ethane, about 8 to about 20% by weight of heptabromodiphenyl ethane, and about 0.5 to about 5% by weight of octabromodiphenyl ethane.

In a still further exemplary embodiment, the brominated diphenyl ethane mixture may comprise about 15 to about 45% by weight of hexabromodiphenyl ethane, about 10 to about 20% by weight of heptabromodiphenyl ethane, about 25 to about 50% by weight of octabromodiphenyl ethane, about 10 to about 30% by weight of nonabromodiphenyl ethane, and about 0.5 to about 3% by weight of decabromodiphenyl ethane.

In the present invention, the brominated diphenyl ethane mixture (B) may be used in the amount of about 1 to about 30 parts by weight based on about 100 parts by weight of the rubber modified vinyl aromatic resin (A). If the brominated diphenyl ethane mixture (B) is used in an amount of less than about 1 part by weight, sufficient flame retardancy may not be obtained. If the brominated diphenyl ethane mixture (B) is used in an amount of more than about 30 parts by weight, fluidity may deteriorate. The brominated diphenyl ethane mixture (B) may be used in an amount of for example about 3 to about 25 parts by weight, as another example about 5 to about 20 parts by weight, and as another example about 7 to about 15 parts by weight, based on about 100 parts by weight of the rubber modified vinyl aromatic resin (A).

Antimony Oxide (C)

In the present invention, antimony oxide functions as a flame retarding aid to improve flame retardancy. Examples of the antimony oxide may include without limitation antimony trioxide, antimony pentoxide, and the like, and a combination thereof. Among these, antimony trioxide may be used.

For antimony trioxide, about 50% of the particles may have a particle size ranging from about 0.01 to about 6 μm, for example about 0.02 to about 3.0 μm.

For antimony pentoxide, about 50% of the particles may have a particle size ranging from about 0.01 to about 1.0 μm, for example about 0.02 to about 0.5 μm.

The antimony oxide (C) of the present invention may be used in an amount of about 1 to about 10 parts by weight based on about 100 parts by weight of the rubber modified vinyl aromatic resin (A). If antimony oxide (C) is used in an amount less than about 1 part by weight, it can be difficult to provide a flame retardancy synergistic effect. When antimony oxide (C) is used in an amount of more than about 10 parts by weight, the balance of physical properties of the resin may deteriorate. As another example, the antimony oxide (C) may be used in an amount of about 1 to about 7 parts by weight or about 2 to about 5 parts by weight.

Bromine-Based Flame Retardant (D)

The flame-retardant high impact vinyl aromatic resin composition of the present invention may optionally further comprise a bromine-based flame retardant (D). Examples of the bromine-based flame retardant (D) may include without limitation tetrabromobisphenol A, decabromodiphenyl oxide, decabrominated diphenyl ethane, 1,2-bis(tribromophenyl) ethane, brominated epoxy oligomers with a weight-average molecular weight of about 600 to about 8000 g/mol, octabromotrimethylphenyl indane, bis(2,3-dibromopropyl ether), tris(tribromophenyl) triazine, brominated aliphatic and aromatic hydrocarbons, and the like, and combinations thereof. The bromine-based flame retardant (D) may used singly or in the form of combinations of two or more thereof.

When a bromine-based flame retardant (D) is present, the amount of a mixture of the brominated diphenyl ethane mixture (B) and the bromine-based flame retardant (D) can be about 10 to about 30 parts by weight, for example about 12 to about 25 parts by weight, based on about 100 parts by weight of the rubber modified vinyl aromatic resin.

If necessary, the thermoplastic resin composition of the present invention may further comprise one or more additives, such as a plasticizer, a flame retardant other than a halogen-based flame retardant, an anti-dripping agent, a thermal stabilizer, a release agent, a weather resistant stabilizer, a halogen stabilizer, a lubricant, a filler, a coupling agent, a photostabilizer, an antioxidant, a coloring agent, an antistatic agent, a dispersant, an impact modifier, and the like, and combinations thereof. These additives may be used singly or in the form of combinations of two or more thereof. Further, other halogen-based or phosphorous-based flame retardants may be used.

The resin composition of the present invention may be manufactured into the form of pellets by mixing the foregoing components and optionally one or more additives and then melting and extruding the mixture in an extruder. The manufactured pellets may be manufactured into various molded articles using known molding methods, such as injection molding, extrusion molding, vacuum molding, and casting molding.

According to another aspect of the present invention, there is provided a molded article obtained by molding the resin composition. The molded article can have excellent impact resistance, fluidity, flame retardancy, and the like, and can be used in a wide variety of products, such as but not limited to components of electric and electronic appliances, exterior materials, car components, miscellaneous goods, structural materials, and the like.

The present invention will be well understood by the following examples. The following examples of the present invention are only for illustrative purposes and are not construed as being limited to the scope of the present invention defined by the appended claims.

EXAMPLES

Specifications of the respective components used in the following Examples and Comparative Examples are as follows.

Rubber Modified Polystyrene Resin (A)

A high flow HIPS resin (HF-1690HD) (A1) having an average rubber particle diameter of 0.3 μm manufactured by Cheil Industries Inc. is used.

A high impact HIPS resin (HR-1360H) (A2) having an average rubber particle diameter of 1 μm manufactured by Cheil Industries Inc. is used.

Brominated Diphenyl Ethane Mixture (B)

A brominated diphenyl ethane mixture is used which is synthesized by adding 5 to 8.5 equivalents of Br to diphenyl ethane as follows such that hydrogen in diphenyl ethane is substituted by Br.

Preparation Example 1

Preparation of B1

About 111 g of dichloroethane and about 163 g of bromine are injected into a 500 ml four-neck flask equipped with a thermometer, a stirrer and a cooling tube, and the mixture is cooled to about −5° C. while being stirred to form a bromine solution. Subsequently, about 156 g of dichloroethane, about 36.4 g of diphenyl ethane and about 0.91 g of ferric chloride are injected into a 1 L four-neck flask, and the mixture is stirred and dissolved to form a reaction solution. The previously prepared bromine solution is dropped into the reaction solution at about 10° C. for about 4 hours, and thereafter the solution is heated and aged at about 25° C. for about 2 hours. After about 75% of the bromine solution is dropped, crystals began precipitating, and the reaction solution finally becomes a slurry state.

After completing the reaction, a solvent is distilled from the solution by injecting about 280 g of water and about 0.8 g of hydrazine into a reactor, removing bromine remaining in the reactor, and heating the solution from which bromine has been removed. About 117.1 g of an ivory-colored brominated diphenyl ethane mixture (B1) is obtained by distilling and filtering all of the solvent, washing the resulting material with water, and drying it at about 100° C. for about 4 hours. The brominated diphenyl ethane mixture is obtained at a high yield of about 95% with respect to the injected diphenyl ethane. CG/MS and elemental analysis results of the obtained brominated diphenyl ethane mixture are represented in Table 1. The average number of bromines substituted in the brominated diphenyl ethane is 5.

Preparation Example 2

Preparation of B2

A preparation process is carried out in the same manner as Preparation Example 1 except that a bromine solution prepared by injecting about 195.6 g of bromine into about 111 g of dichloroethane is titrated. The prepared brominated diphenyl ethane mixture (B2) is about 124.6 g.

Preparation Example 3

Preparation of B3

About 111 g of dichloroethane and about 208.6 g of bromine are injected into a 500 ml four-neck flask equipped with a thermometer, a stirrer and a cooling tube, and the mixture is cooled to about −5° C. while being stirred to form a bromine solution. Subsequently, about 156 g of dichloroethane, about 36.4 g of diphenyl ethane and about 0.91 g of ferric chloride are injected into a 1 L four-neck flask, and the mixture is stirred and dissolved to form a reaction solution. The previously prepared bromine solution is dropped into the reaction solution at about 10° C. for about 4 hours, and thereafter the solution is heated and aged at about 25° C. for about 2 hours. After about 75% of the bromine solution is dropped, crystals began precipitating, and the reaction solution finally became a slurry state.

After completing the reaction, a solvent is distilled from the solution by injecting about 280 g of water and about 0.8 g of hydrazine into a reactor, removing bromine remaining in the reactor, and heating the solution from which bromine has been removed. About 130.6 g of an ivory-colored brominated diphenyl ethane mixture (B3) is obtained by distilling and filtering all of the solvent, washing the resulting material with water, and drying it at about 100° C. for about 4 hours. The brominated diphenyl ethane mixture is obtained at a high yield of about 95% with respect to the injected diphenyl ethane. CG/MS and elemental analysis results of the obtained brominated diphenyl ethane mixture are represented in Table 1. The average number of bromines substituted in the brominated diphenyl ethane is 6.4.

Preparation Example 4

Preparation of B4

A preparation process is carried out in the same manner as Preparation Example 1 except that a bromine solution prepared by injecting about 220 g of bromine into about 111 g of dichloroethane is titrated. The prepared brominated diphenyl ethane mixture (B4) is about 135.8 g.

Preparation Example 5

Preparation of B5

A preparation process is carried out in the same manner as Preparation Example 1 except that a bromine solution prepared by injecting about 228.2 g of bromine into about 111 g of dichloroethane is titrated. The prepared brominated diphenyl ethane mixture (B5) is about 139.5 g.

Preparation Example 6

Preparation of B6

A preparation process is carried out in the same manner as Preparation Example 1 except that a bromine solution prepared by injecting about 239.6 g of bromine into about 111 g of dichloroethane is titrated. The prepared brominated diphenyl ethane mixture (B6) is about 144.8 g.

Preparation Example 7

Preparation of B7

A preparation process is carried out in the same manner as Preparation Example 1 except that a bromine solution prepared by injecting about 251 g of bromine into about 111 g of dichloroethane is titrated. The prepared brominated diphenyl ethane mixture (B7) is about 150.1 g.

Preparation Example 8

Preparation of B8

A preparation process is carried out in the same manner as Preparation Example 1 except that a bromine solution prepared by injecting about 260.8 g of bromine into about 111 g of dichloroethane is titrated. The prepared brominated diphenyl ethane mixture (B8) is about 154.5 g.

Preparation Example 9

Preparation of B9

A preparation process is carried out in the same manner as Preparation Example 1 except that a bromine solution prepared by injecting about 277.1 g of bromine into about 111 g of dichloroethane is titrated. The prepared brominated diphenyl ethane mixture (B9) is about 162.1 g.

Preparation Example 10

Preparation of B10

About 111 g of dichloroethane and about 239.6 g of bromine are injected into a 500 ml four-neck flask equipped with a thermometer, a stirrer and a cooling tube, and the mixture is maintained to about −5° C. while being stirred to form a bromine solution. Subsequently, about 156 g of dichloroethane, about 36.4 g of diphenyl ethane and about 0.91 g of zirconium chloride are injected into a 1 L four-neck flask, and the mixture is stirred and dissolved to form a reaction solution. The previously prepared bromine solution is dropped into the reaction solution at about 50° C. for about 4 hours, and thereafter the solution is heated and aged at about 75° C. for about 2 hours. After about 75% of the bromine solution is dropped, crystals began precipitating, and the reaction solution finally became a slurry state.

After completing the reaction, a solvent is distilled from the solution by injecting about 280 g of water and about 0.8 g of hydrazine into a reactor, removing bromine remaining in the reactor, and heating the solution from which bromine has been removed. About 147 g of an ivory-colored brominated diphenyl ethane mixture (B1) is obtained by distilling and filtering all of the solvent, washing the resulting material with water, and drying it at about 100° C. for about 4 hours. The brominated diphenyl ethane mixture is obtained at a high yield of about 95.1% with respect to the injected diphenyl ethane. CG/MS and elemental analysis results of the obtained brominated diphenyl ethane mixture are represented in Table 1. The average number of bromines substituted in the brominated diphenyl ethane is about 7.5.

Compositions of the synthesized brominated diphenyl ethane mixtures are analyzed using GC/MS after completely dissolving given samples into toluene to a dilution factor of about 2000 (about 0.5 mg/mL) and then filling GC vials with 1 mL of the dissolved solution. Agilent 7683 injector, Agilent 7890N Gas Chromatography, and Agilent 5975C Mass Spectroscopy Detector are used as measuring instruments. The respective compositions are measured at an inlet temperature of about 320° C., a split ratio of splitless, and an MS interface temperature of about 280° C. by using a column of UA-1 or DB-5HT having a column flow rate of 1.0 ml/min according to an oven temperature program of 40° C. (2 min)-40° C./min→200° C.-10° C./min→260° C.-20° C./min→340° C. (2 min). The qualitative analysis is conducted by injecting about 1 μl of the samples into a GC/MSD using an autosampler. The respective measured compositions are used based on an area. The Br content analysis is performed using an IC and measured by drawing up calibration curves using an IC-500 after injecting an excessive amount of oxygen into the samples and burning them. The compositions of the flame retardants are represented in the following Table 1.

TABLE 1

| Composition | Area Ratio (%) | | | | | | | | | |
|---|---|---|---|---|---|---|---|---|---|---|
| | B1 | B2 | B3 | B4 | B5 | B6 | B7 | B8 | B9 | B10 |
| Equivalent of Br | 5 | 6 | 6.4 | 6.75 | 7 | 7.35 | 7.7 | 8 | 8.5 | 7.5 |
| Br4 | 18.9 | — | — | — | — | 1.5 | — | — | — | — |
| Br5 | 64.7 | 13.6 | 1.6 | 1.4 | 0.9 | 1.9 | — | — | — | 20.3 |
| Br6 | 16.4 | 79.9 | 83.0 | 77.6 | 71.2 | 65.7 | 57.4 | 35.4 | 16.0 | 21.9 |
| Br7 | — | 6.2 | 13.5 | 13.4 | 13.8 | 12.8 | 15.0 | 16.1 | 17.1 | 39.2 |
| Br8 | — | 0.3 | 1.9 | 6.6 | 10.7 | 13.5 | 18.2 | 30.6 | 41.0 | 1.3 |
| Br9 | — | — | — | 1.0 | 3.4 | 4.5 | 8.8 | 16.8 | 24.3 | 16.7 |
| Br10 | — | — | — | — | — | 0.1 | 0.6 | 1.1 | 1.6 | 0.6 |

Antimony Oxide (C)

Antimony trioxide (ANTIS-W) manufactured by Il Sung Antimony Co., Ltd. of the Republic of Korea is used.

Bromine-Based Flame Retardants (D)

Decabromodiphenyl ethane (Product Name: SAYTEX 4010) (D1) manufactured by Albemarle Corporation is used.

2,4,6-tris(2,4,6-tribromophenoxy)-1,3,5-triazine (Product Name: FR-245) (D2) manufactured by ICL Industrial Products is used.

A capping type brominated epoxy oligomer (Product Name: KB-560) (D3) manufactured by KUKDO Chemical Co., Ltd. is used.

Examples 1 to 9

After mixing the respective foregoing components in the amounts represented in the following Tables 2 to 4, pellets are produced by extruding the mixture of the components with an ordinary twin extruder at a temperature range of about 190 to about 230° C. After drying the produced pellets at about 70° C. for 3 hours, samples for testing physical properties and flame retardancy are manufactured by injecting the pellets with a 6-oz injector under conditions of a molding temperature of about 180 to about 220° C. and a mold temperature of about 30 to about 50° C.

Flame retardancy of the manufactured samples is measured at a sample thickness of 1/16" in accordance with a standard UL 94. Izod impact strength (kgf·cm/cm) is measured in accordance with ASTM D256 (1/8", notched). Melt flow index (g/10 min) is measured according to ASTM D1238 (200° C./5 kg). Specific gravity is measured in accordance with ASTM D792. The measurements results are represented in the following Table 2.

TABLE 2

| | | | Example | | | | | | | | |
|---|---|---|---|---|---|---|---|---|---|---|---|
| Classification | | | 1 | 2 | 3 | 4 | 5 | 6 | 7 | 8 | 9 |
| Part by weight | HIPS (A) | A1 | 70 | 70 | 70 | 70 | 70 | 70 | 70 | 70 | 70 |
| | | A2 | 30 | 30 | 30 | 30 | 30 | 30 | 30 | 30 | 30 |
| | (B) | B1 | 26 | — | — | — | — | — | — | — | — |
| | | B2 | — | 21 | — | — | — | — | — | — | — |
| | | B3 | — | — | 19.5 | — | — | — | — | — | — |
| | | B4 | — | — | — | 18.2 | — | — | — | — | — |
| | | B5 | — | — | — | — | 17.8 | — | — | — | — |
| | | B6 | — | — | — | — | — | 16.5 | — | — | — |
| | | B7 | — | — | — | — | — | — | 16 | — | — |
| | | B8 | — | — | — | — | — | — | — | 15 | — |
| | | B9 | — | — | — | — | — | — | — | — | 14.3 |
| | Antimony oxide (C) | | 4 | 4 | 4 | 4 | 4 | 4 | 4 | 4 | 4 |
| Melt flow index | | | 36.5 | 35.0 | 33.0 | 30.0 | 30.5 | 29.5 | 28.5 | 29.0 | 28.0 |
| Impact strength | | | 9.5 | 9.5 | 9.5 | 10.0 | 10.5 | 10.0 | 10.5 | 10.0 | 10.0 |
| Flame retardancy (1.5 mm) | Flame retardancy grade | | V-0 | V-0 | V-0 | V-0 | V-0 | V-0 | V-0 | V-0 | V-0 |
| | Total burning time (sec) | | 20" | 15" | 17" | 15" | 18" | 18" | 15" | 18" | 20" |
| Specific gravity | | | 1.165 | 1.162 | 1.160 | 1.157 | 1.157 | 1.155 | 1.153 | 1.152 | 1.150 |

Examples 10 to 15

Samples are manufactured in the same manner as in Example 1 except that a mixture of the brominated diphenyl ethane mixtures (B) and the bromine-based flame retardants (D) are used as flame retardants. The compositions and measurement results of the samples are represented in the following Table 3.

TABLE 3

| | | | Example | | | | | |
|---|---|---|---|---|---|---|---|---|
| Classification | | | 10 | 11 | 12 | 13 | 14 | 15 |
| Part by weight | HIPS (A) | A1 | 70 | 70 | 70 | 70 | 70 | 70 |
| | | A2 | 30 | 30 | 30 | 30 | 30 | 30 |
| | (B) | B7 | 3 | — | 8.5 | — | 8.5 | — |
| | | B8 | — | 3 | — | 8.5 | — | 8.5 |
| | | B9 | — | — | — | — | — | — |
| | Antimony oxide (C) | | 4 | 4 | 4 | 4 | 4 | 4 |
| | (D) | D1 | 12 | 12 | — | — | — | — |
| | | D2 | — | — | 8.5 | 8.5 | — | — |
| | | D3 | — | — | — | — | 12 | 12 |
| Melt flow index | | | 14.5 | 15.0 | 23.5 | 22.0 | 30.5 | 22.6 |
| Impact strength | | | 10.0 | 10.0 | 11.0 | 11.0 | 9.0 | 10.5 |
| Flame retardancy (1.5 mm) | Flame retardancy grade | | V-0 | V-0 | V-0 | V-0 | V-0 | V-0 |
| | Total burning time (sec) | | 18" | 17" | 15" | 16" | 20" | 18" |
| Specific gravity | | | 1.151 | 1.150 | 1.151 | 1.153 | 1.157 | 1.156 |

Comparative Examples 1 to 7

Samples are manufactured in the same manner as in Example 1 except that the bromine-based flame retardants (D) are used as flame retardants. Compositions and measurement results of the samples are represented in the following Table 4.

TABLE 4

| | | | Comparative Example | | | | | | |
|---|---|---|---|---|---|---|---|---|---|
| Classification | | | 1 | 2 | 3 | 4 | 5 | 6 | 7 |
| Part by weight | HIPS (A) | A1 | 70 | 70 | 70 | 70 | 70 | 70 | 70 |
| | | A2 | 30 | 30 | 30 | 30 | 30 | 30 | 30 |
| | (B) | B10 | — | — | — | — | — | — | 16 |
| | Antimony oxide (C) | | 4 | 4 | 4 | 4 | 4 | 4 | 4 |
| | (D) | D1 | 15 | 12 | 12 | — | — | — | — |
| | | D2 | — | 4 | — | 19 | — | 8 | — |
| | | D3 | — | — | 5 | — | 22 | 12 | — |
| Melt flow index | | | 12.0 | 13.5 | 15.0 | 18.5 | 35.6 | 29.0 | 11 |
| Impact strength | | | 9.0 | 9.0 | 8.0 | 9.5 | 6.5 | 7.5 | 8 |
| Flame retardancy (1.5 mm) | Flame retardancy grade | | V-0 | V-0 | V-0 | V-0 | V-0 | V-0 | V-0 |
| | Total burning time (sec) | | 20" | 15" | 10" | 18" | 20" | 20" | 15" |
| Specific gravity | | | 1.144 | 1.151 | 1.165 | 1.161 | 1.161 | 1.161 | 1.155 |

As represented in the above Tables 2 and 3, the Examples in which the brominated diphenyl ethane mixtures are added to the rubber modified polystyrene resin can maintain more excellent flame retardancy as compared with Comparative Examples comprising same amount of the flame retardants, can solve deterioration problems with mechanical physical properties and melt flow indexes occurring when excessive quantities of existing flame retardants are injected into the resin, and can obtain flame-retardant high impact polystyrene (HIPS) resin compositions with relatively low specific gravities.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame-retardant impact resistant vinyl aromatic resin composition, comprising:
   (A) about 100 parts by weight of a rubber modified vinyl aromatic resin;
   (B) about 1 to about 30 parts by weight of a brominated diphenyl ethane mixture based on about 100 parts by weight of the rubber modified vinyl aromatic resin (A), wherein the brominated diphenyl ethane mixture (B)

comprises about 55 to about 85% by weight of hexabromodiphenyl ethane and about 1 to about 25% by weight of odd number brominated diphenylethanes, based on the total weight of the brominated diphenyl ethane mixture; and (C) about 1 to about 10 parts by weight of antimony oxide based on about 100 parts by weight of the rubber modified vinyl aromatic resin (A).

2. The flame-retardant impact resistant vinyl aromatic resin composition of claim 1, wherein the rubber modified vinyl aromatic resin (A) is a polymer comprising about 5 to about 15% by weight of a rubber polymer and about 85 to about 95% by weight of a vinyl aromatic monomer.

3. The flame-retardant impact resistant vinyl aromatic resin composition of claim 1, wherein the rubber modified vinyl aromatic resin (A) is a mixture of a rubber modified vinyl aromatic resin (A1) having an average rubber particle diameter of about 0.1 to about 0.9 μm and a rubber modified vinyl aromatic resin (A2) having an average rubber particle diameter of about 0.9 to about 4 μm.

4. The flame-retardant impact resistant vinyl aromatic resin composition of claim 1, wherein the brominated diphenyl ethane mixture (B) is prepared by brominating diphenyl ethane and comprises about 0 to about 30% by weight of heptabromodiphenyl ethane, based on the total weight of the brominated diphenyl ethane mixture.

5. The flame-retardant impact resistant vinyl aromatic resin composition of claim 1, wherein the brominated diphenyl ethane mixture (B) comprises about 0 to about 2% by weight of pentabromodiphenyl ethane, about 55 to about 85% by weight of hexabromodiphenyl ethane, about 1 to about 20% by weight of heptabromodiphenyl ethane, about 1 to about 25% by weight of octabromodiphenyl ethane, about 0 to about 10% by weight of nonabromodiphenyl ethane, and about 0 to about 5% by weight of decabromodiphenyl ethane.

6. The flame-retardant impact resistant vinyl aromatic resin composition of claim 1, wherein the brominated diphenyl ethane mixture (B) comprises about 5 to about 15% by weight of pentabromodiphenyl ethane, about 72 to about 85% by weight of hexabromodiphenyl ethane, about 2 to about 10% by weight of heptabromodiphenyl ethane, and about 0.1 to about 3% by weight of octabromodiphenyl ethane.

7. The flame-retardant impact resistant vinyl aromatic resin composition of claim 1, wherein the brominated diphenyl ethane mixture (B) comprises about 55 to about 75% by weight of hexabromodiphenyl ethane, about 11 to about 16% by weight of heptabromodiphenyl ethane, about 10 to about 20% by weight of octabromodiphenyl ethane, and about 1 to about 9% by weight of nonabromodiphenyl ethane.

8. The flame-retardant impact resistant vinyl aromatic resin composition of claim 1, wherein the brominated diphenyl ethane mixture (B) comprises about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, and about 1 to about 7% by weight of nonabromodiphenyl ethane.

9. The flame-retardant impact resistant vinyl aromatic resin composition of claim 1, wherein the brominated diphenyl ethane mixture (B) comprises about 0.1 to about 3% by weight of pentabromodiphenyl ethane, about 55 to about 83% by weight of hexabromodiphenyl ethane, about 7 to about 15% by weight of heptabromodiphenyl ethane, about 5 to about 20% by weight of octabromodiphenyl ethane, about 1 to about 7% by weight of nonabromodiphenyl ethane, and about 0.01 to about 1% by weight of decabromodiphenyl ethane.

10. The flame-retardant impact resistant vinyl aromatic resin composition of claim 1, further comprising a flame retardant including bromine (D) comprising tetrabromobisphenol A, decabromodiphenyl oxide, decabrominated diphenyl ethane, 1,2-bis(tribromophenyl)ethane, brominated epoxy oligomers with a weight-average molecular weight of about 600 to about 8000 g/mol, octabromotrimethylphenyl indane, bis(2,3-dibromopropyl ether), tris(tribromophenyl) triazine, brominated aliphatic and aromatic hydrocarbons, or a combination thereof.

11. The flame-retardant impact resistant vinyl aromatic resin composition of claim 10, comprising the brominated diphenyl ethane mixture (B) and the flame retardant including bromine (D) in an amount of about 10 to about 30 parts by weight based on about 100 parts by weight of the rubber modified vinyl aromatic resin (A).

12. The flame-retardant impact resistant vinyl aromatic resin composition of claim 1, further comprising an additive comprising a plasticizer, a flame retardant other than a halogen-based flame retardant, an anti-dripping agent, a thermal stabilizer, a release agent, a weather resistant stabilizer, a halogen stabilizer, a lubricant, a filler, a coupling agent, a photostabilizer, an antioxidant, a coloring agent, an antistatic agent, a dispersant, an impact modifier, or a combination thereof.

* * * * *